Patented Apr. 22, 1947

2,419,327

UNITED STATES PATENT OFFICE 2,419,327

CORROSION INHIBITORS—NITRITE SALTS OF SECONDARY AMINES

Aaron Wachter and Nathan Stillman, Berkeley, Calif., assignors to Shell Development Company, San Francisco, Calif., a corporation of Delaware No Drawing. Application June 28, 1943, Serial No. 492,640

5 Claims. (Cl. 252—392)

The present invention relates to water corrosion prevention inhibitors. More specifically it relates to corrosion inhibitors particularly suitable for use in preventing corrosion of certain metal surfaces by water associated in relatively small quantities with organic materials.

In the handling of various organic materials, particularly hydrocarbons and similar organic liquid compositions, it is often necessary to transport and/or store such materials in metal containers, as in steel or other metal pipelines, drums, tanks and the like. Since these materials often contain varying amounts of water in solution or in suspension which may separate, due to temperature changes, for example, internal corrosion of the container by separated water almost invariably occurs to a greater or lesser degree. This problem is especially serious when gasoline is under consideration. In spite of all reasonable and practicable precautions during the manufacture of gasoline, when the same is transported in pipelines or stored in drums or tanks for a period of time, especially as is so often practiced in handling aviation gasoline, an appreciable quantity of water separates and is found as a film or in minute droplets on the pipeline or container walls or even in small pools in the bottom of the container. This brings about ideal conditions for corrosion and consequent damage to the metal surfaces of the container as well as the even more serious contamination of the gasoline or other material contained therein by the corrosion products.

As the result of the above-described corrosion it has become necessary for manufacturers and shippers of such products to apply various internal coatings to the container walls or to add corrosion inhibitors of one type or another to the product being stored or shipped. It has long been recognized, however, that one of the great difficulties in inhibiting this type of corrosion lies in the fact that those inhibitors which are soluble in organic materials are relatively ineffective in preventing water corrosion of metal surfaces. On the other hand, those inhibitors which are efficient in preventing this type of corrosion are but slightly, if at all, soluble in organic materials and their application is thus rendered quite difficult for these purposes.

For example, various water-soluble corrosion inhibitors may be utilized for preventing corrosion of gasoline storage tanks by water collecting in the bottom of the tank, a suitable and sufficient quantity of the desired inhibitor being injected in the bottom of the tank to inhibit both water already separated or intentionally maintained therein and water which may later separate from the gasoline and collect in the bottom of the tank. However, part of the water which separates collects on the tank wall, corroding and damaging the same, the corrosion products in turn contaminating the gasoline.

Analogous corrosion problems occur in numerous other fields; for example in the lubrication of internal combustion engines, steam engines including turbines, and other similar machinery, quantities of water are often observed as a separate phase within the lubricating system as a result of condensation of water from the atmosphere, or, in the case of combustion engines, as a result of dispersion or absorption in the lubricating oil of water formed as a product of fuel combustion. Water in such instances corrodes the various metal parts of the machinery with which it comes in contact, the corrosion products causing further mechanical damage to bearing surfaces and the like due to their abrasive nature and catalytically promoting the chemical degradation of the lubricant. In this instance, as in the example cited above, the inhibitors known to the art have not always been entirely satisfactory, the organic material-soluble inhibitors being, in general, relatively ineffective water-corrosion inhibitors, and the water-soluble inhibitors being difficult and in most instances impracticable in their application. The same or similar problems arise in the preparation and use of various coating compositions such as greases, waxes, household oils, paints, lacquers, water-soluble paints, etc., which are often applied to metal surfaces for protective or other purposes.

It is an object of the present invention to provide potent corrosion inhibitors which are soluble in both organic materials and water. A further object is to provide inhibitors of this type which satisfactorily prevent corrosion of certain metal surfaces by water. Further objects are to provide water-corrosion inhibitors which are stable at ordinary temperatures of use, easily and inexpensively prepared and will not deleteriously affect organic materials with which they are incorporated. Other objects, together with some of the advantages to be derived in utilizing the inhibitors of the present invention, will become apparent from the following detailed description thereof.

It has been found, according to the present invention, that certain nitrite salts of secondary amines are excellent water-corrosion inhibitors and are soluble both in water and organic materials. The amines preferably used in preparing the present inhibitors include those secondary amines which have basic dissociation constants at least approximately as high as the acidic dissociation constant of nitrous acids; i. e., with nitrous acid having a dissociation constant $K_a=4\times10^{-4}$ at 18° C., the secondary amines used in preparing the nitrite salt should have dissociation constants at least approximately $K_b=4\times10^{-4}$ at 18° C. in order to prepare salts which are stable at temperatures of the order of 20° C. or more. If the composition containing the inhibitor is to be exposed to relatively high temperatures, such as may be encountered in inhibited lubricating oil for engines (160° C. to 180° C. for internal combustion engines, 75° C. to 90° C. for turbine oils, etc.), a secondary amine having a dissociation constant sufficiently high and a suitable molecular structure to form a nitrite salt stable at these temperatures must, of course, be selected.

Bases which are not suitable are those which are very easily oxidized or otherwise destroyed, either upon use or in contact with nitrous acid.

Secondary amines which are specifically suited to yield relatively stable salts of nitrous acid are members of the following classes:

Secondary amines of the formula

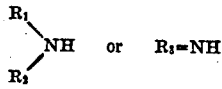

wherein $R_1$ and $R_2$ are hydrocarbon radicals which may be aliphatic, alicyclic, heterocyclic, or aromatic, and may, if desired, contain preferably not more than one olefinic double bond; and $R_1$ and $R_2$ may join to form a ring radical $R_3$.

Specific examples of suitable secondary amines are listed below:

Secondary amines: methyl n-butylamine, methyl isobutylamine, methyl tertiary-butylamine, methyl amylamine, amyl hexylamine, N-methyl cyclohexylamine, dicyclohexylamine, methyl benzylamine; corresponding ethyl, propyl and higher amines; dibenzylamine, di-(beta phenyl ethyl) amine; piperidine, piperazine, morpholine, etc.

In selecting one of the above secondary amines for making the corresponding salt, consideration should be given to the fact that when a salt which is relatively highly soluble in water-immiscible organic materials is desired, a secondary amine having a sufficient number of carbon atoms to impart to the salt the necessary solubility should be chosen. As a rule, for these purposes it is desirable that the nitrogen base have at least 5 carbon atoms. For use with organic materials which are water-miscible to an appreciable extent, secondary amines having less than 5 carbon atoms may be utilized and in some instances will be found preferable.

The several hydrocarbon radicals may contain stable and inert polar substitution radicals, though preferably not more than one each. Too many polar radicals tend in general to reduce the solubilities of the salts in various organic substances, particularly in hydrocarbon oils and the like. Suitable polar radicals include chlorine, ether, sulfide, alcohol, amine, etc., radicals.

Nitrous acid salts of secondary amines are suitable for use in preventing corrosion of metal surfaces by water associated in small quantities with hydrocarbons such as liquid propane, butane, n-pentane, iso-pentane, hexanes, iso-octanes, benzene, toluene, xylenes; various gasolines, e. g., natural gasoline, straight-run gasoline, cracked gasolines (catalytically or thermally cracked, reformed, isomerized, etc.), Diesel fuels, range fuels, bunker fuels, lubricating oils, greases, petrolatum, paraffin wax, vegetable waxes, resins, asphalts, paints, lacquers, enamels, etc.

The inhibitors of the present invention may be prepared, in most instances, by stoichiometric reaction of an organic secondary amine with nitrous acid.

In certain instances the inhibitors may be prepared in situ, as for example an oil which inhibited water-corrosion of metal surfaces was prepared by passing nitrous acid gas through an oil containing secondary amines in solution, thus forming water and oil-soluble secondary amine nitrite salts. Other methods which have been found more generally suitable for preparing nitrite salts of secondary amines include the following:

Method I.—The hydrochloride of the organic secondary amine is contacted with sodium nitrite in a solution in which the corresponding organic secondary amine inhibitor salt is insoluble, the reaction yielding, by double decomposition, the inhibitor salt as a precipitate and leaving an inorganic chloride in solution.

Method II.—An acetone solution of the organic secondary amine is prepared and dry hydrogen chloride gas passed therethrough. A reaction results from which is obtained the corresponding organic secondary amine hydrochloride, which is usually relatively insoluble in cold acetone and precipitates. Silver nitrite, freshly prepared from silver nitrate and sodium nitrite and dried with acetone, is then mixed with the secondary amine chloride in the acetone. A second reaction thereupon occurs, yielding an acetone solution of the secondary amine nitrite salt and a silver chloride precipitate. Although in this instance both reactants are but slightly soluble in acetone, by virtue of the extremely low solubility of the silver chloride in acetone, the reaction usually proceeds to completion at room temperature within a period of approximately one hour. The silver chloride is filtered from the acetone and the acetone filtrate evaporated to obtain the desired secondary amine nitrite, which may be further purified by recrystallization from a suitable solvent.

Method III.—A preferred method for preparing organic secondary amine nitrite salts for the purposes of the present invention comprises slowly adding concentrated sulfuric acid to an approximately 50% by volume aqueous solution of acetone in the presence of the secondary amine and an excess of sodium nitrite. After the reaction has occurred, the mixture is diluted to about 10 times its original volume with acetone, resulting in a solution of the secondary amine nitrite salt and a precipitate of insoluble salts such as sodium sulfate and sodium nitrite. After filtration of the insoluble salts the acetone solution is evaporated to recover the organic nitrite salt, which may be further purified by recrystallization from a suitable solvent.

By using one of the above procedures, the nitrite salt of the secondary amines previously mentioned can be prepared, provided that at the end of the reaction the solution of organic nitrite salt or an aqueous extract thereof has a pH of at least approximately 7, as the organic nitrite salts tend to decompose in acidic solution.

The compounds listed in Table I below were prepared by Method II above.

Table I

| Compound | NO₂ Content, per cent w. | |
|---|---|---|
| | Calculated | Analysis |
| Morpholine nitrite | 34.4 | 33.8 |
| Dibenzylamine nitrite | 18.8 | 20.3 |

The compounds listed in Table II below were prepared by Method III described above.

Table II

| Compound | NO₂ Content, per cent w. | |
|---|---|---|
| | Calculated | Analysis |
| Dicyclohexylamine nitrite | 20.2 | 18.2 |
| Morpholine nitrite | 34.4 | 32.6 |
| Dibenzylamine nitrite | 18.8 | 19.9 |
| 2,4,4,6-tetramethyl tetrahydro-1,3-oxazine nitrite | 24.3 | 24.9 |
| Methylisobutylcarbamine nitrite | 31.1 | 30.6 |
| Piperidine nitrite | 34.8 | 29.8 |

Method III is generally preferred in preparing the compounds of the present invention in view of the superior yields which are usually obtained. For example, in preparing the compounds listed above by this method, yields in excess of 90% by weight were obtained in the case of piperidine nitrite, while yields in excess of 75% by weight were obtained in preparing methylisobutylcarbamine nitrite, morpholine nitrite and dibenzylamine nitrite.

The presently described inhibitors are most effective in preventing water-corrosion of ferrous metals, aluminum, nickel, chromium, and alloys of these metals. To a lesser extent the secondary amine nitrite salt inhibitors are also beneficial in preventing water corrosion of copper and copper alloys.

The inhibitors of the present invention may be incorporated in any substantially neutral or alkaline organic material, whether solid, semi-solid or liquid, in which they are soluble and with which they do not react. Thus, they may be added to hydrocarbons (which may be paraffinic, olefinic, naphthenic or aromatic) of the type described; or to chlorinated hydrocarbons, alcohols, ethers, esters, ketones, nitriles, amino compounds, amides, non-edible fats and fatty oils, paints, varnishes, natural waxes, oils, etc., which in the presence of H₂O do not render the water acidic.

When adding the inhibitors to light hydrocarbon oils such as gasoline, benzene, kerosene, etc., .005% by weight of the nitrite salt will generally be found satisfactory for inhibition of water-corrosion. The precise amount of inhibitor to be utilized in each instance will, of course, vary with the particular conditions at hand and should be determined experimentally, particularly when unusually severe corrosion conditions are to be overcome. However, in the majority of practical applications when handling substantially water-insoluble organic materials of this type, the addition of approximately .0001% to .3% by weight of inhibitor will be found satisfactory.

Larger amounts of inhibitor may be required for inhibiting other organic materials, particularly those miscible with water, such as alcohols, ketones, and the like, as for example methyl alcohol, ethyl alcohol, propyl alcohol, acetone, methyl ethyl ketone, methyl vinyl ketone, dioxane, etc. In such instances quantities of inhibitor amounting to approximately .01% to .5% by weight of the water content of the organic material are preferably utilized.

Among other suitable applications for the present inhibitors the following come into consideration. For slushing oils and other rust-preventive coatings, nitrous acid salts of secondary amines will be found effective as corrosion inhibitors, for most practical applications, when incorporated in the coatings in amounts ranging approximately as follows: oil base coatings, 0.05% to 1.0% by weight; wax base coatings, other than petroleum wax (petrolatum) base coatings, 0.05% to 1.0% by weight; petroleum wax base coatings, 0.05% to 5.0% based on the petroleum wax content of the particular coating; primer coatings for paint, 0.02% to 0.3% by weight based on the dry constituents; lubricant compositions, such as lubricating oils for internal combustion engines, turbines and the like, greases, semi-greases, etc., 0.005% to 0.2% by weight; general purpose oils, such as household oils, 0.05% to 1.0%.

The optimum quantity of the present inhibitors to be used will, of course, vary with the particular conditions under which they are used and the specific inhibitor compound utilized.

In those applications wherein water having acidic characteristics is encountered, a small quantity of an alkalizing agent should be added, when secondary amine nitrite salts are used. It has been found that these inhibitors are relatively ineffectual for inhibiting corrosion of metal surfaces by water having a pH less than 6. This is another reason why the composition containing the inhibitor should be alkaline. The desired pH may be maintained, when necessary, by adding a sufficient quantity of a water-soluble alkaline compound, such as sodium hydroxide, to the water to increase the pH to at least 6, or by adding a sufficient quantity of a suitable nitrogen base, such as 3,3,5-trimethylcyclohexyl amine to the organic material in which the inhibitor is incorporated. Best results are obtained when the pH of the water is held to a value of at least approximately 8, no additional advantage being obtained above a pH of 12.

In all instances the action of the inhibitors described above appears to be the same. Being soluble in both water and organic materials, they may be easily incorporated in most organic materials. When the material to which the inhibitors have been added is brought into contact with free water, either by means of externally introduced moisture or by separation of water from the organic material, the water takes up inhibitor from the organic material and is rendered innocuous with regard to the metal surfaces noted above. Thus, for example, in the specific instance wherein one of the inhibitors of the present invention is added to gasoline which is to be stored in a tank or similar vessel, water separating from the gasoline and either falling to the bottom of the tank or adhering to the walls of the tank takes up inhibitor from the gasoline with which it is in contact and becomes inhibited.

The following specific example serves to illustrate the effectiveness of the presently disclosed corrosion inhibitors:

EXAMPLE

One inch square low carbon steel specimens were placed in glass receptacles containing 20 cc. of benzene to which had been added varying amounts of various secondary amine nitrite inhibitors. A corrosive consisting of either 0.05 cc. of an aqueous solution containing 0.05% by weight of sodium chloride or the same amount of water was then sprayed through the benzene in each receptacle and on to the steel specimen. Visual examination of the steel specimens was made after standing under the above conditions at room temperature for a period of seven days. The following results were obtained:

Table III

| Exp. | Conc. of inhibitor in benzene | Corrosive | Appearance of specimen after 7 days |
|---|---|---|---|
|  | Per cent by weight |  |  |
| 1 | 0.014 | Water | No rust. |
| 2 | 0.0014 | ----do---- | Do. |
| 3 | 0.00014 | ----do---- | Very light rust spots. |
| 4 | 0.014 | NaCl in water | No rust. |
| 5 | 0.0014 | ----do---- | Very light rust spots. |
| 6 | 0.0013 | ----do---- | No rust. |
| 7 | 0.00013 | ----do---- | Slight staining in spots. |
| 8 | 0.00005 | ----do---- | Very light rust spots. |

In the above Table III, in Experiments 1 through 5, methylisobutylcarbamine nitrite was used as the inhibitor; in Experiments 6 and 7 piperidine nitrite was used as the inhibitor; and in Experiment 8, 2,4,4,6-tetramethyl tetrahydro-1,3-oxazine nitrite was used as the inhibitor.

The stability of various representative secondary amine nitrite inhibitors in water at elevated temperatures is indicated by the following experiments in which aqueous solutions containing 0.01 grams of inhibitor in 100 cc. of water were refluxed at 100° C. for a period of 6 hours.

Table IV

| Inhibitor | $NO_2$ Content, wt. per cent | | |
|---|---|---|---|
|  | Theoretical | Analysis | Analysis after Refluxing |
| Methylisobutylcarbamine nitrite | 31.1 | 30.6 | 30.6 |
| Piperidine nitrite | 34.8 | 29.8 | 27.7 |
| Morpholine nitrite | 34.3 | 32.6 | 31.9 |
| 2,4,4,6-tetramethyl tetrahydro-1,3-oxazine nitrite | 24.3 | 24.9 | 24.1 |
| Dibenzylamine nitrite | 18.8 | 19.9 | 19.7 |

The results in the above Table IV clearly demonstrate that little, if any, decomposition of these inhibitors takes place in aqueous solutions even at temperatures considerably above those encountered in most corrosion inhibition problems.

We claim as our invention:

1. A non-corrosive composition of matter comprising an organic material having a pH of at least approximately 7 and coming in contact with water during the useful life thereof, said organic material having dissolved therein in minor proportion, but in amount sufficient to inhibit corrosion of metal surfaces by said water, a nitrite salt of a secondary amine, said secondary amine salt being stable at atmospheric temperature, soluble in water and in said organic material.

2. A non-corrosive composition of matter comprising an organic material having a pH of at least approximately 7 and coming in contact with water during the useful life thereof, said organic material having dissolved therein in minor proportion, but in amount sufficient to inhibit corrosion of metal surfaces by said water, dicyclohexylamine nitrite.

3. A non-corrosive composition of matter comprising an organic material having a pH of at least approximately 7, and coming in contact with water during the useful life thereof, said organic material having dissolved therein in minor proportion, but in amount sufficient to inhibit corrosion of metal surfaces by said water, a nitrite salt of a propyl secondary amine, said amine salt being stable at atmospheric temperature, soluble in water and in said organic material.

4. A non-corrosive composition of matter comprising a water-insoluble organic liquid having a pH of at least approximately 7, and coming in contact with water during the useful life thereof, said organic liquid having dissolved therein in minor proportion, but in amount sufficient to inhibit corrosion of metal surfaces by said water, a nitrite salt of a secondary amine, said secondary amine salt being stable at atmospheric temperature, soluble in water and in said organic liquid.

5. A non-corrosive composition of matter comprising a liquid hydrocarbon which may come in contact with water during the useful life thereof, said hydrocarbon having dissolved therein in minor proportion, but in amount sufficient to inhibit corrosion of metal surfaces by said water, a nitrite salt of a secondary amine, said secondary amine salt being stable at atmospheric temperature, soluble in water and in said hydrocarbon.

AARON WACHTER.
NATHAN STILLMAN.

REFERENCES CITED

The following references are of record in the file of this patent:

UNITED STATES PATENTS

| Number | Name | Date |
|---|---|---|
| 2,321,517 | Rosen | June 8, 1943 |
| 2,318,606 | Goebel et al. | May 11, 1943 |
| 2,297,666 | Wachter | Sept. 29, 1942 |
| 2,148,862 | Kern | Feb. 28, 1939 |
| 2,012,307 | Flett | Aug. 27, 1935 |
| 2,007,199 | Holt | July 9, 1935 |
| 2,283,931 | Irwin | May 26, 1942 |
| 2,333,206 | Sloan | Nov. 2, 1943 |
| 2,308,282 | Howland et al. | Jan. 12, 1943 |

OTHER REFERENCES

Lucas, Organic Chemistry, American Book Co., 1935, p. 284.

Hackh's Chemical Dictionary, 3rd ed., 1944, p. 43.